United States Patent
Li et al.

(10) Patent No.: US 10,866,452 B2
(45) Date of Patent: Dec. 15, 2020

(54) COLOR FILTER SUBSTRATE, PRODUCTION METHOD THEREOF, DISPLAY PANEL, AND DISPLAY APPARATUS

(71) Applicant: BOE TECHNOLOGY GROUP CO., LTD., Beijing (CN)

(72) Inventors: Hui Li, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/336,011

(22) PCT Filed: Jul. 13, 2018

(86) PCT No.: PCT/CN2018/095562
§ 371 (c)(1),
(2) Date: Mar. 22, 2019

(87) PCT Pub. No.: WO2019/042024
PCT Pub. Date: Mar. 7, 2019

(65) Prior Publication Data
US 2019/0369439 A1 Dec. 5, 2019

(30) Foreign Application Priority Data
Aug. 31, 2017 (CN) .................. 2017 2 1114547 U

(51) Int. Cl.
*G02F 1/1335* (2006.01)
*G02F 1/1362* (2006.01)

(52) U.S. Cl.
CPC .. *G02F 1/133514* (2013.01); *G02F 1/136209* (2013.01)

(58) Field of Classification Search
CPC ........... G02F 2201/52; G02F 1/133514; G02F 1/136209
See application file for complete search history.

(56) References Cited

U.S. PATENT DOCUMENTS

2004/0125278 A1* 7/2004 Park .................. G02F 1/133514
349/106
2016/0055807 A1* 2/2016 Lee .................. G02F 1/134336
345/205

FOREIGN PATENT DOCUMENTS

| CN | 101063726 A | 10/2007 |
|---|---|---|
| CN | 101430397 A | 5/2009 |
| CN | 202126515 U | 1/2012 |

(Continued)

OTHER PUBLICATIONS

International Search Report and English Translation of Box V of the Written Opinion dated Sep. 6, 2018, received for corresponding PCT Application No. OCT/CN2018/095562.

*Primary Examiner* — James A Dudek
(74) *Attorney, Agent, or Firm* — Kinney & Lange, P.A.

(57) ABSTRACT

Provided are a color filter substrate, a production method thereof, a display panel, and a display apparatus, which belong to the technical field of display. The color filter substrate has: a base substrate; a plurality of color filter units in an array arrangement on the base substrate, wherein each of the color filter units comprises at least two color filters of different colors, and the at least two color filters comprise a blue color filter; wherein the blue color filter has the smallest thickness among the at least two color filters of each of the color filter units.

10 Claims, 5 Drawing Sheets

(56) References Cited

FOREIGN PATENT DOCUMENTS

| | | |
|---|---|---|
| CN | 202710771 U | 1/2013 |
| CN | 207216211 U | 4/2018 |
| JP | 04181219 A | 6/1992 |
| JP | 2003005213 A | 1/2003 |

* cited by examiner

COLOR FILTER SUBSTRATE, PRODUCTION METHOD THEREOF, DISPLAY PANEL, AND DISPLAY APPARATUS

CROSS-REFERENCE TO RELATED APPLICATION

This disclosure claims the priority of Chinese Patent Application No. 201721114547.X filed on Aug. 31, 2017, which is incorporated herein by reference in its entirety.

TECHNICAL FIELD

This disclosure relates to the technical field of display, and particularly to a color filter substrate, a production method thereof, a display panel, and a display apparatus.

BACKGROUND ART

A thin-film transistor liquid crystal display (simply referred to as: TFT-LCD) comprises a liquid crystal panel, a back light source, and a driving circuit board, wherein the liquid crystal panel is composed of an array substrate, a color filter substrate, and a liquid crystal layer located between the array substrate and the color filter substrate. TFT-LCD is a non-active light-emitting element, wherein a light source is required to be provided by a back light source therein, grayscale display of two colors, black and white, is formed by controlling the rotation angle of liquid crystal, and a color display image is then formed by a color filter layer on a color filter substrate.

When the grayscale level is relatively high, blue grey inversion will occur in a blue color filter part in a color filter substrate, which impacts the display effect.

SUMMARY OF THE INVENTION

In one aspect of this disclosure, there is provided a color filter substrate, comprising:
  a base substrate;
  a plurality of color filter units in an array arrangement on the base substrate, wherein each of the color filter units comprises at least two color filters of different colors, and the at least two color filters comprise a blue color filter;
  wherein the blue color filter has the smallest thickness among the at least two color filters of each of the color filter units.

Optionally, in each of the color filter units, the at least two color filters are aligned in a line, and the blue color filter is located at an end portion of the line.

Optionally, the blue color filter has the largest area among the at least two color filters of each of the color filter units.

Optionally, each of the color filter units comprises a blue color filter, a red color filter, and a green color filter.

Optionally, the blue color filter has a thickness of 1.55 micrometers to 2.00 micrometers;
the red color filter has a thickness of 1.70 micrometers to 2.15 micrometers; and
the green color filter has a thickness of 1.85 micrometers to 2.30 micrometers.

Optionally, the blue color filter has a thickness of 1.55 micrometers to 2.00 micrometers;
the green color filter has a thickness of 1.70 micrometers to 2.15 micrometers; and
the red color filter has a thickness of 1.85 micrometers to 2.30 micrometers.

Optionally, the area of the blue color filter is 1.05 to 1.1 times that of the red color filter, and/or the area of the blue color filter is 1.05 to 1.1 times that of the green color filter.

Optionally, the color filter is produced from a resin material.

Optionally, the color filter substrate further comprises a black matrix which is on the base substrate and between the color filter units.

In another aspect of this disclosure, there is provided a method for producing the color filter substrate described above, wherein each color filter in the at least two color filters is formed by the steps of:
  covering the base substrate with a color filter material layer;
  covering the color filter material layer with a photoresist layer;
  exposing, developing, and peeling the photoresist layer to pattern the photoresist layer and expose a part of the color filter material layer; and
  performing etching treatment and removing the exposed color filter material layer and the patterned photoresist layer to form a patterned color filter,
  wherein among the at least two color filters, a blue color filter is first formed, and the blue color filter is etched and the thickness thereof is reduced in the process(es) of forming one or more other color filters.

Optionally, in each of the color filter units, the at least two color filters are aligned in a line, and the blue color filter is located at an end portion of the line.

In yet another aspect of this disclosure, there is provided a display panel, comprising:
  an array substrate,
  the color filter substrate described above,
  a liquid crystal layer located between the array substrate and the color filter substrate.

Optionally, the display panel comprises an integrated circuit, and
the display panel has a display region, a first strip-shaped non-display region, and a second strip-shaped non-display region, wherein the color filter substrate is in the display region, the integrated circuit is in the first strip-shaped non-display region, the first strip-shaped non-display region is adjacent to the second strip-shaped non-display region in a clockwise order observing from the front of the display panel,
  and
  in each of the color filter units, the at least two color filters are aligned in a line, the blue color filter is located at an end portion of the line, and the blue color filter is closest to the second strip-shaped non-display region.

Optionally, the first strip-shaped non-display region is below the display region and the second strip-shaped non-display region is on the left of the display region observing from the front of the display panel, or
the first strip-shaped non-display region is above the display region and the second strip-shaped non-display region is on the right of the display region observing from the front of the display panel.

In still another aspect of this disclosure, there is provided a display apparatus, comprising the display panel described above.

DESCRIPTION OF DRAWINGS

FIG. 5-1 is a schematic sectional view of the structure of a color filter unit provided in an embodiment of this disclosure;

FIG. 5-2 is a schematic sectional view of the structure of another color filter unit provided in an embodiment of this disclosure;

FIG. 6-1 is a schematic plan view of the structure of yet another color filter unit provided in an embodiment of this disclosure;

FIG. 6-2 is a schematic plan view of the structure of still another color filter unit provided in an embodiment of this disclosure;

FIG. 7-1 is a plan view of a display panel provided in an embodiment of this disclosure;

FIG. 7-2 is a plan view of another display panel provided in an embodiment of this disclosure; and FIG. 7-3 is a plan view of yet another display panel provided in an embodiment of this disclosure.

DESCRIPTION OF EMBODIMENTS

In order to enable objects, technical solutions, and advantages of this disclosure to be clearer, embodiments of this disclosure will be further described in details in conjunction with accompanying drawings.

A TFT-LCD comprises a liquid crystal panel, a back light source, and a driving circuit board, wherein the liquid crystal panel is composed of an array substrate, a color filter substrate, and a liquid crystal layer located between the array substrate and the color filter substrate.

In the related art, when a color filter substrate is produced, it typically comprises: forming a black matrix on a base substrate, coating a red film layer on the base substrate formed with the black matrix to form a red color filter by a patterning process, coating a green film layer on the base substrate formed with the red color filter to form a green color filter by a patterning process, and coating a blue film layer on the base substrate formed with the green color filter to form a blue color filter by a patterning process, wherein the patterning process mainly comprises photoresist coating, exposing, developing, etching, and photoresist peeling. In the process of producing a color filter layer, the red color filter is etched three times, the green color filter is etched twice, and the blue color filter is etched once, and the blue color filter in the color filter layer finally formed has a thickness slightly greater than those of the green color filter and the red color filter.

However, in the color filter substrate prepared in the related art, when the grayscale level is relatively high, the light transmittance of the blue color filter will decrease and the transmittances of the red color filter and the green color filter will increase as the grayscale level increases. With respect to a display panel having a relatively high contrast, since the contrast of the display panel is high, i.e., the grayscale level is relatively high, blue light transmitted by the color filter substrate is less upon display of an image and a phenomenon of blue grey inversion will occur on the image, which leads to a poor display effect of the display panel.

An embodiment of this disclosure provides a color filter substrate, a display panel, and a display apparatus, which may at least partly solve the problem of the poor display effect of the display panel caused by less blue light transmitted by the color filter substrate.

Figure 1:
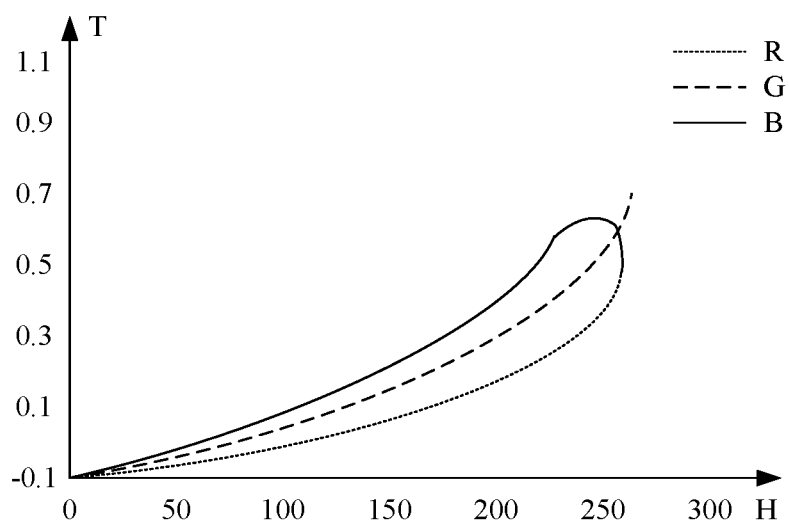
FIG. 1 is a schematic view for the relationship between the light transmittance of a color filter in the related art and the grayscale level.

The color filter substrate may comprise a black matrix and a color filter layer, and the color filter layer may be composed of a red color filter (R), a green color filter (G), and a blue color filter (B). Typically, in the related art, a red color filter, a green color filter, and a blue color filter may be formed in this order on a base substrate formed with a black matrix. Since the color filter of each color is formed by a patterning process, the patterning process mainly comprises photoresist coating, exposing, developing, etching, and photoresist peeling, therefore, in the process of producing a color filter layer, the red color filter is etched three times, the green color filter is etched twice, and the blue color filter is etched once, and the blue color filter in the color filter layer finally formed has a thickness slightly greater than those of the green color filter and the red color filter. The relationship between the light transmittance of a color filter in a color filter layer in the related art and the grayscale level may be as shown in FIG. 1, wherein the abscissa is the grayscale level H, and the ordinate is the light transmittance T of the color filter. When the grayscale level of a display panel is relatively high (i.e., greater than a certain numeric value), the light transmittance of a blue color filter is significant reduced and a phenomenon of blue grey inversion will occur on the image, which leads to a poor display effect of the display panel.

Figure 2:
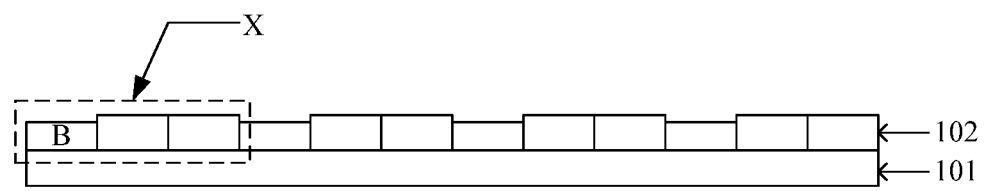
FIG. 2 is a schematic sectional view of the structure of a color filter substrate provided in an embodiment of this disclosure.

An embodiment of this disclosure provides a color filter substrate, which may at least partly solve the above problem present in the related art. As shown in FIG. 2, the color filter substrate 10 may comprise:

a base substrate 101.

The color filter substrate 10 may further comprise a color filter layer 102 provided on the base substrate 101. The color filter layer 102 comprises a plurality of color filter units X in an array arrangement, wherein each of the color filter units X comprises at least two color filters of different colors, and the at least two color filters comprise a blue color filter B. In FIG. 2, each of the color filter units X comprises three color filters. The color filter unit may comprise color filters of two, three, four, or more colors. In the color filter unit, the color filters are typically aligned in a row. The same color filter units are in a repeated array arrangement in the color filter substrate to form pixels in an array arrangement.

The blue color filter B in each of the color filter units X has the smallest thickness, which is less than the thickness of any other color filter.

The relationships between the thicknesses of other color filters are not defined in this disclosure. In FIG. 2, the thicknesses of the other two color filters are shown to be the same. Their thicknesses may also be different, as long as both of them are greater than the thickness of the blue color filter.

Figure 3:
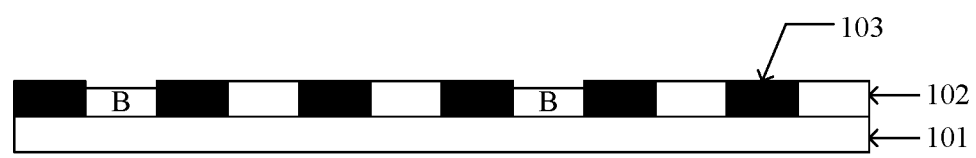
FIG. 3 is a schematic sectional view of the structure of another color filter substrate provided in an embodiment of this disclosure.
Figures 1, 7:
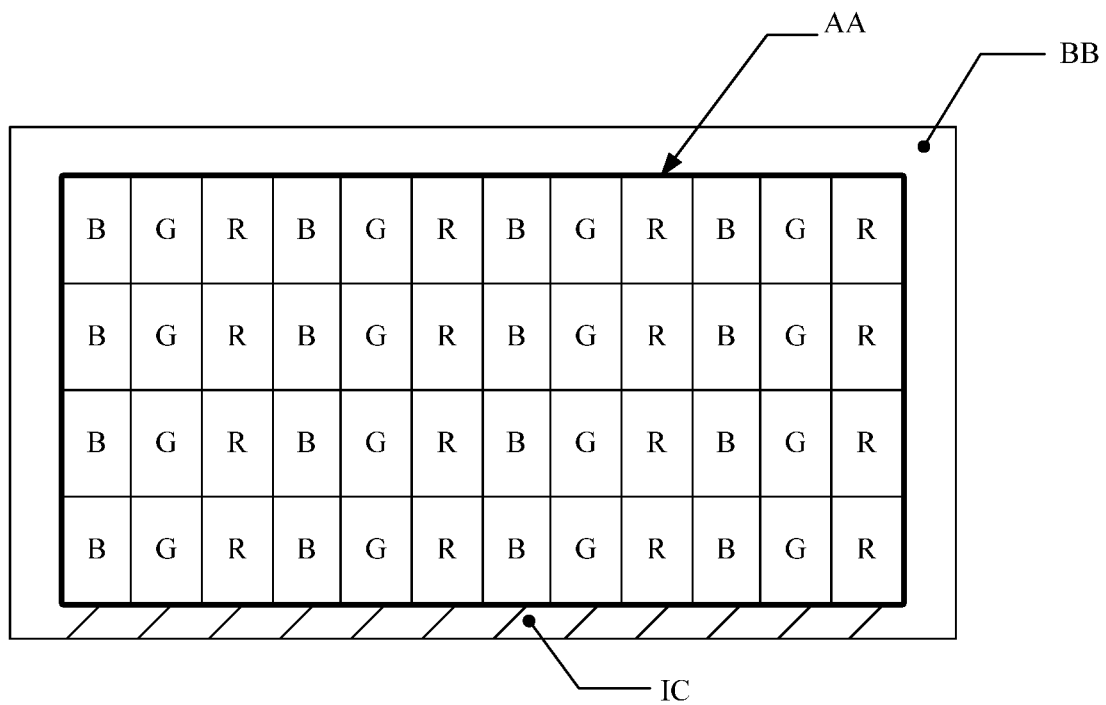
Figures 2, 7:
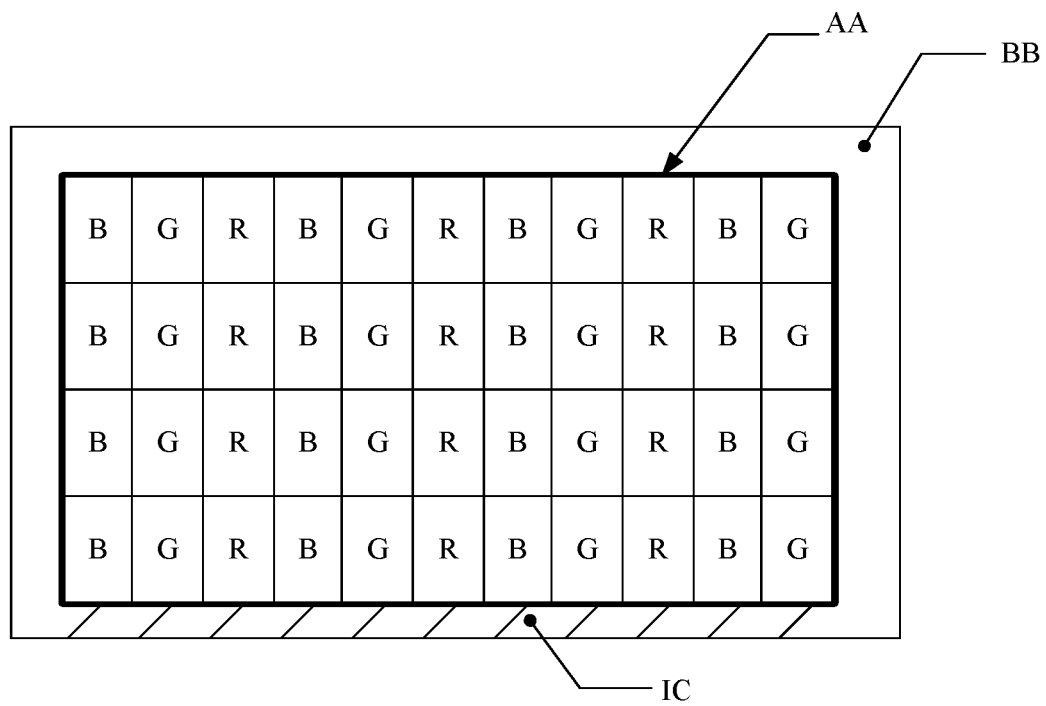
Figures 3, 7:
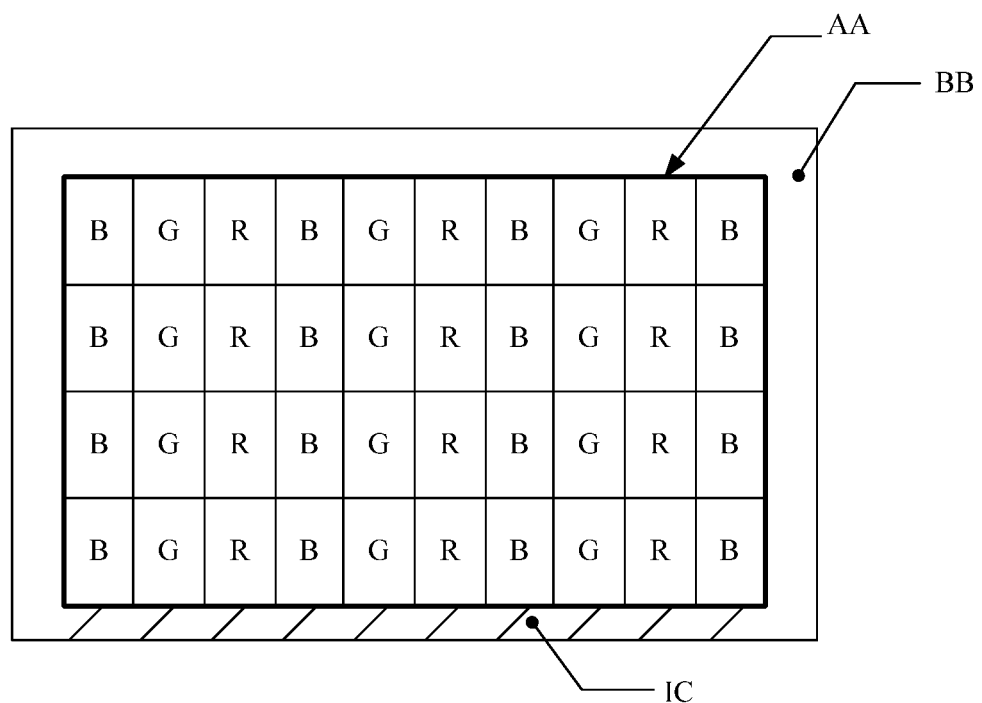

The color filter substrate comprises an array of color filter units. Typically, each color filter unit corresponds to one pixel, and each color filter therein corresponds to one sub-pixel. For example, the color filter unit may correspond to a RGB pixel. That is, red, green, and blue color filters are comprised therein, and the color filter of each color corresponds to a sub-pixel of the corresponding color. For example, the arrangement of the color filter units on the color filter substrate may be as schematically shown in FIG. 7-1. Each color filter unit is composed of B, G, R color filters aligned in a line, and a plurality of the same color filter units are in an array arrangement in transverse and longitudinal directions in the color filter substrate. It is to be noted that there may be an incomplete color filter unit or pixel at the edge of the color filter substrate. For example, as schematically shown in FIG. 7-2 or 7-3, one or two color filters, may be absent at the right edge of the color filter substrate according to practical needs. The specific arrangement of the color filter at the edge of the color filter substrate is not particularly limited in this disclosure.

The color filter unit may also have color filters of four or more colors, or may only have color filters of two colors.

Optionally, the base substrate may be produced from a glass material, or may be produced from a transparent material such as polymethyl methacrylate (simply referred to as PMMA) and the like. This is not limited in embodiments of this disclosure.

In the color filter substrate provided in an embodiment of this disclosure, since the thickness of the blue color filter is less than those of other color filters, the light transmittance of the blue color filter is greater than those of other color filters. In the case where the grayscale degree of the display panel is relatively high, the blue light transmitted by the blue color filter is allowed to be balanced with light transmitted by other color filters when the display panel displays images, to reduce the impact of the blue inversion effect and improve the color fidelity of images, so that the display effect of the display panel may be ensured.

Optionally, in each of the color filter units, the at least two color filters are aligned in a line, and the blue color filter is located at an end portion of the line. The arrangement means of the color filters in the color filter units in an array arrangement in the color filter substrate are the same. For example, as shown in FIG. 7-1, each color filter unit is composed of three color filters, which are BGR color filters, from left to right, wherein the B color filter is located at one end portion of the line in which BGR color filters are aligned, the G color filter is located in the middle part, and the R color filter is located on the other end portion.

In the related art, when color filters of various colors are formed, the color filters of various colors are sequentially formed. When the color filter unit is produced, if the color filters are aligned in a line, a typical process is sequentially producing the color filters from one end to the other end in the color filter line. For example, if there is a line of a first color filter, a second color filter, and a third color filter in the color filter unit, a conventional process using a photolithographic method with a mask typically comprises first forming a first color filter, then forming a second color filter, and finally forming a third color filter; or first forming a third color filter, then forming a second color filter, and finally forming a first color filter. That is, the color filters are sequentially formed from one end to the other end in the color filter line. Typically, the color filter located in the middle part (i.e., not at end portions) of the color filter line is not first formed, because it is not convenient for the process. Therefore, when the color filters in each color filter unit are aligned in a line, the blue color filter may be first formed if it is located at one end. As described in details below, when the blue color filter is first formed, it may be etched just to be the thinnest to reduce the impact of the blue grey inversion effect and improve the display effect of the display panel. Therefore, it is more convenient for the production of the color filter substrate wherein the blue color filter is located at the end portion of the color filter line, compared to the case where the blue color filter is designed to be not at end portions of the color filter line. Additionally, in industrial automated production, since the photolithographic production of color filters is typically performed in a manner of gradual displacement of a mask, the color filters are typically produced from one end of the color filter line. Therefore, the color filter substrate designed above may be industrially produced without changing the current industrial standard production line. The blue color filter may be produced at either end of the color filter line, and the color filter substrate may be suitably assembled into a display panel as needed.

Optionally, the blue color filter has the largest area among the at least two color filters of each of the color filter units. The area of the blue color filter is allowed to be the largest, and the amount of blue light transmitted by the color filter substrate may be increased. Therefore, the blue light transmitted by the blue color filter is allowed to be balanced with light transmitted by other color filters when the display panel displays images to reduce the impact of the blue grey inversion effect, so that the display effect of the display panel may be further improved.

Optionally, like color filter substrates typically used for RGB display, the color filter unit of the color filter substrate of this disclosure comprises a blue color filter, a red color filter, and a green color filter. Optionally, the blue color filter has a thickness of 1.55 micrometers to 2.00 micrometers; the red color filter has a thickness of 1.70 micrometers to 2.15 micrometers; and the green color filter has a thickness of 1.85 micrometers to 2.30 micrometers. Optionally, the arrangement order of the color filters is blue-red-green, and steps are formed. The structure described above may be easily obtained by first forming a blue color filter, then forming a red color filter, and finally forming a green color filter. This is because the blue color filter is etched twice, the red color filter is etched once, and the green color filter is not etched, as described in details below. Likewise, optionally, the blue color filter has a thickness of 1.55 micrometers to 2.00 micrometers; the green color filter has a thickness of 1.70 micrometers to 2.15 micrometers; and the red color filter has a thickness of 1.85 micrometers to 2.30 micrometers. Optionally, the arrangement order of the color filters is blue-green-red, and steps are formed. This structure may also be easily obtained.

When the color filter unit comprises blue, red, and green color filters, optionally, the area of the blue color filter is 1.05 to 1.1 times that of the red color filter, and/or the area of the blue color filter is 1.05 to 1.1 times that of the green color filter.

Optionally, the color filter is produced from a resin material. The resin material is suitable for the photolithographic method and may be etched so that the thickness will be easily controlled.

It is to be indicated that, as shown in FIG. 3, the color filter substrate 10 may further comprise a black matrix 103 which is on the base substrate 101 and between the color filter units. In the production, the color filter layer 102 may be produced on the base substrate 101 provided with the black matrix 103. It is also possible to first form the color filter layer 102 and the form the black matrix 103. Furthermore, the black matrix may also be overlapped with the color filter unit.

This disclosure provides a method for producing the color filter substrate described above, wherein each color filter in the at least two color filters is formed by the steps of:

covering the base substrate with a color filter material layer;

covering the color filter material layer with a photoresist layer;

exposing, developing, and peeling the photoresist layer to pattern the the photoresist layer and expose a part of the color filter material layer; and performing etching treatment and removing the exposed color filter material layer and the patterned photoresist layer to form a patterned color filter, wherein among the at least two color filters, a blue color filter is first formed, and the blue color filter is etched and the thickness thereof is reduced in the process(es) of forming one or more other color filters.

In the method of this disclosure, the blue color filter is etched in the process of forming subsequent color filters and the thickness thereof is reduced so as to have the smallest thickness, thereby obtaining the color filter substrate of this disclosure. Optionally, when a color filter unit having three color filters is formed, the blue color filter may be etched twice, and the second color filter formed may be etched once. Such a process complies with the production method of the color filter layer in the color filter substrate in the related art.

Optionally, in each of the color filter units, the at least two color filters are aligned in a line, and the blue color filter is located at an end portion of the line, as described above. Since it more convenient to first produce the color filter at the end portion in the color filter line in terms of the process, it is easiest for the production using the design wherein the blue color filter is located at an end portion of the line. Such an arrangement is favorable to the production of the color filter substrate of this disclosure.

Optionally, before the base substrate is covered with a color filter material layer, a black matrix is formed on the base substrate, and the color filter unit arranged between the black matrices is subsequently formed.

Figure 4:
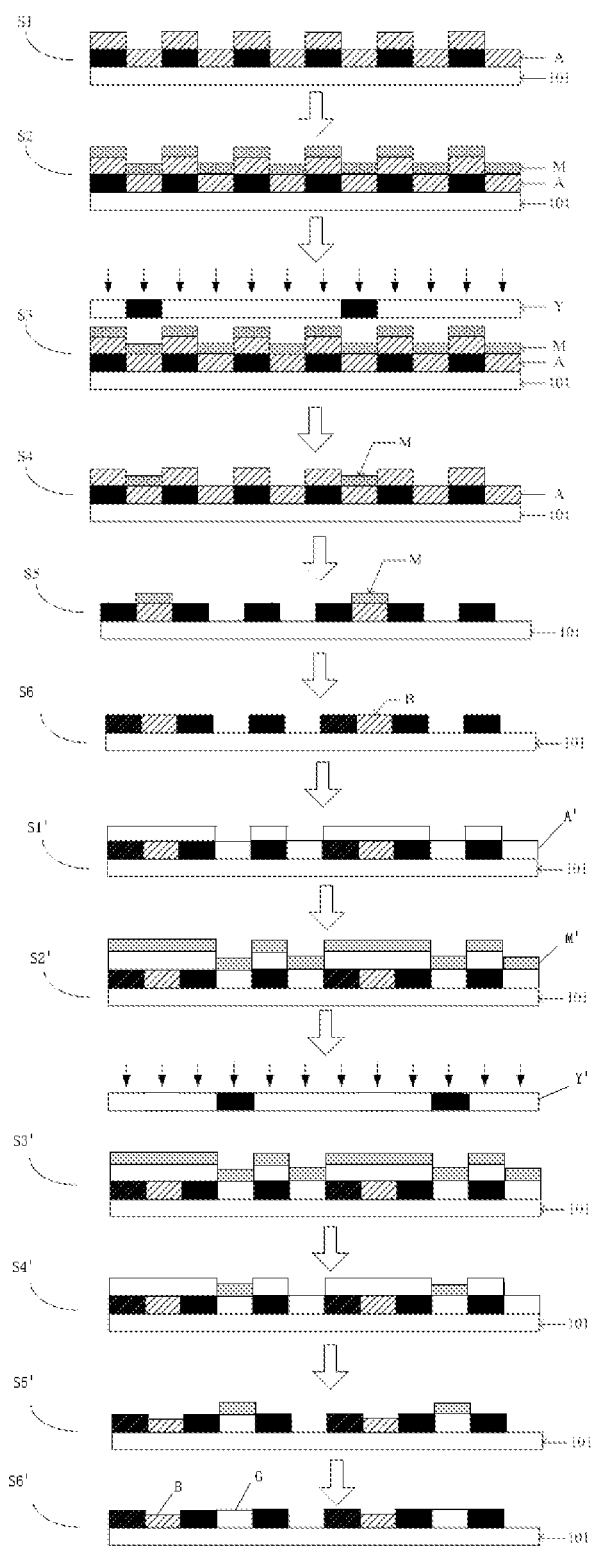
FIG. 4 is a schematic view of a process flow for producing a color filter provided in an embodiment of this disclosure.

In an embodiment of this disclosure, when a color filter unit is formed on the base substrate formed with the black matrix, a blue color filter is first formed on the base substrate formed with the black matrix. The process may be as shown in FIG. 4, comprising:

S1, forming a blue color filter film A on the base substrate 101 formed with the black matrix (wherein the black solid rectangular represents a black matrix).

Optionally, the process of forming a blue color filter film may comprise:

adhesive spreading, wherein a blue color filter material is evenly spread on the whole base substrate by using a spreading plate; spin coating, wherein the base substrate coated with the blue color filter material is provided on a spin coating machine in a manner of vacuum adsorption, and liquid is dropped at the center and the spin coating machine is manipulated to rotate at a high speed to form a blue color filter film having a certain thickness on the base substrate; and pre-baking, wherein the solvent in the blue color filter film is allowed to volatilize so as to improve the adhesion between the blue color filter film and the base substrate.

It is to be noted that the thicknesses of the layers in the figure are schematic and do not form any limitation. For example, when adhesive spreading is used, the upper surface of the blue color filter material above the black matrix may be almost flush with the upper surface of the blue color filter material between the black matrices.

Optionally, the blue color filter material may be a blue resin material.

S2, coating a photoresist on the base substrate 101 formed with blue color filter film A to form a photoresist layer M.

Optionally, the photoresist may be coated in a manner of spin coating, and the photoresist coated may be a positive photoresist or may be a negative photoresist. This is not limited in embodiments of this disclosure.

S3, exposing the photoresist layer M at a side of the photoresist layer M away from the base substrate 101 by using a mask plate Y.

Optionally, when the photoresist used is a positive photoresist, the pattern of the mask plate used is the same as that of the blue color filter to be formed; when the photoresist used is a negative photoresist, the pattern of the mask plate used is opposite to that of the blue color filter to be formed.

As shown in FIG. 4, illustration is made by taking a positive photoresist as an example in the embodiment of this disclosure. The black region in the mask plate represents a light-transmitting zone.

S4, developing the exposed photoresist layer M to form a patterned photoresist.

Optionally, when the photoresist used is a positive photoresist, the photoresist in the exposed region can be removed after development; when the photoresist used is a negative photoresist, the photoresist in the unexposed region can be removed after development.

S5, etching a color filter material layer A. Dry etching or wet etching may be used. The color filter material layer covered and protected by the photoresist is not etched, and the color filter material layer not covered and protected by the photoresist is completely etched off.

It is to be understood that the photoresist layer may also be etched off in some etching processes, but the color filter material layer therebelow is allowed to be at least less etched compared to the exposed part.

S6, peeling the photoresist layer, if there is a residual photoresist layer, to obtain a blue color filter B.

If the photoresist layer has been depleted in the etching process, this step may be omitted.

It is to be understood that the black matrix may also be absent between the color filters.

Optionally, each of the color filter units may comprise a blue color filter, a red color filter, and a green color filter, wherein the thickness of the blue color filter is less than that of the red color filter and the thickness of the blue color filter is less than that of the green color filter. With respect to the method for forming a green color filter (or a red color filter), FIG. 4 may be subsequently referred to.

S1', similar to S1, further forming, for example, a green color filter film A' on the base substrate. Of course, a red color filter or other color filters may also be formed. The process of forming a green color filter film is similar to the process of forming a blue color filter film, and may also comprise steps of adhesive spreading, spin coating, pre-baking, and the like.

S2', similar to S2, coating a photoresist on the base substrate 101 formed with green color filter film A' to form a photoresist layer M'.

S3', similar to S3, exposing the photoresist layer M' at a side of the photoresist layer M' away from the base substrate 101 by using a mask plate Y'.

S4', similar to S4, developing the exposed photoresist layer M' to form a patterned photoresist.

S5', similar to S5, etching a color filter layer A'. In this process, the thickness of the blue color filter B previously formed is reduced due to further etching.

S6', similar to S6, peeling the photoresist layer, if there is a residual photoresist layer, to obtain a green color filter G. The thickness of the blue color filter B is less than that of the green color filter G.

A red color filter R may be further formed by similar steps. In this process, both of the B color filter and the G color filter are thinned due to further etching. Therefore, in the final color filter substrate, the blue color filter has the smallest thickness and the red color filter has the largest thickness.

On the one hand, the red color filter R and the green color filter G may be formed in this order on the base substrate formed with the blue color filter B. The color filter unit X formed may be as shown in FIG. 5-1, wherein the blue color filter B, the red color filter R, and the green color filter G are arranged, in this order, from left to right, along the line direction of the base substrate.

Figures 1, 5:
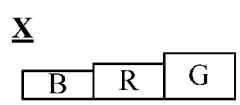
Figures 2, 5:
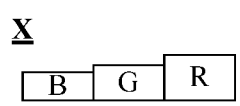

Optionally, in the color filter unit X as shown in FIG. 5-1, the thickness of the blue color filter is less than that of the red color filter and the thickness of the red color filter is less than that of the green color filter.

Exemplarily, the blue color filter may have a thickness of 1.55 micrometers to 2.00 micrometers; the red color filter may have a thickness of 1.70 micrometers to 2.15 micrometers; and the green color filter may have a thickness of 1.85 micrometers to 2.30 micrometers.

On the other hand, the green color filter G and the red color filter R may be formed in this order on the base substrate formed with the blue color filter B. The color filter unit X formed may be as shown in FIG. 5-2, wherein the blue color filter B, the green color filter G, and the red color filter R arranged, in this order, from left to right, along the line direction of the base substrate.

Optionally, in the color filter unit X as shown in FIG. 5-2, the thickness of the blue color filter is less than that of the green color filter and the thickness of the green color filter is less than that of the red color filter.

Exemplarily, the blue color filter may have a thickness of 1.55 micrometers to 2.00 micrometers; the green color filter may have a thickness of 1.70 micrometers to 2.15 micrometers; and the red color filter may have a thickness of 1.85 micrometers to 2.30 micrometers.

It can be understood that the thicknesses of the three color filters may gradually increase from left to right in the color filter unit as shown in FIGS. 5-1 and 5-2. However, other configurations may apply. For example, the B color filter may be located at the center, or the B color filter may be located at the right end, as long as it is the thinnest. This object may be achieved as long as the positions of mask plate openings for forming the color filter layers are appropriately selected. Typically, however, the color filters will be sequentially formed one by one from one end in a conventional production of the color filter unit, as described above. Therefore, the color filters in FIG. 5-1 or 5-2 are typical.

Further, the area of the blue color filter is greater than or equal to those of the red color filter and/or the green color filter.

Figures 1, 6:
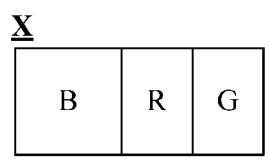
Figures 2, 6:
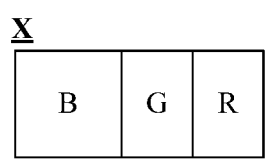

Optionally, FIGS. 6-1 and 6-2 may be plan views of the color filter unit X. As shown in FIG. 6-1 or FIG. 6-2, the area of the blue color filter B may be greater than those of the red color filter R and the green color filter G.

Exemplarily, the area of the blue color filter may be 1.05 to 1.1 times that of the red color filter, and/or the area of the blue color filter may be 1.05 to 1.1 times that of the green color filter. For example, the area of the red color filter and/or green color filter may be 450 square micrometers, whereas the area of the blue color filter may be 472.5 to 495 square micrometers. As another example, the area of the red color filter and/or green color filter may be 7500 square micrometers, whereas the area of the blue color filter may be 7875 to 8250 square micrometers. The area of the blue color filter is allowed to be greater than those of other color filters, and the amount of blue light transmitted by the color filter substrate may be increased. Therefore, the blue light transmitted by the blue color filter is allowed to be balanced with light transmitted by other color filters when the display panel displays images to reduce the impact of the blue grey inversion effect, so that the display effect of the display panel may be further improved.

Optionally, the color filters may be produced from a resin material, wherein the blue color filter is produced from a blue resin material, the red color filter is produced from a red resin material, and the green color filter is produced from a green resin material.

In summary, in the color filter substrate provided in an embodiment of this disclosure, since the thickness of the blue color filter is less than those of other color filters, the light transmittance of the blue color filter is greater than those of other color filters. In the case where the grayscale degree of the display panel is relatively high, the blue light transmitted by the blue color filter is allowed to be balanced with light transmitted by other color filters when the display panel displays images to reduce the impact of the blue grey inversion effect and improve the color fidelity of images, so that the display effect of the display panel may be ensured.

An embodiment of this disclosure provides a display panel, comprising an array substrate, the color filter substrate of this disclosure, and a liquid crystal layer located between the array substrate and the color filter substrate. The color filter substrate may be the color filter substrate as shown in FIG. 2 or 3. Blue grey inversion will not easily occur in this display panel.

Optionally, the display panel comprises an integrated circuit, and the display panel has a display region, a first strip-shaped non-display region, and a second strip-shaped non-display region, wherein the color filter substrate is in the display region, the integrated circuit is in the first strip-shaped non-display region, the first strip-shaped non-display region is adjacent to the second strip-shaped non-display region in a clockwise order observing from the front of the display panel, and in each of the color filter units, the at least two color filters are aligned in a line, and the blue color filter is located at an end portion of the line, and the blue color filter is closest to the second strip-shaped non-display region.

It is to be indicated that the color filter substrate is to be mounted in the display panel. Alternatively stated, the display panel is mounted with the color filter substrate. The color filter substrate is in a display region for color display. The color filter substrate being in the display region said herein means that the color filter substrate is substantially in the display region. In practical use, some edge portions of the color filter substrate may also be outside the display region. Typically, the non-display region of the display panel is composed of four strip-shaped non-display regions which are sequentially in head-to-tail connection, and a rectangular display region is surrounded by the four strip-shaped non-display regions. The integrated circuit (IC) is typically provided in the non-display region. An example is a display panel having a rectangular frame, but this disclosure is not limited thereto. Optionally, the color filter substrate of this disclosure is mounted in the display panel in a manner as follows. When the IC is provided in a first strip-shaped non-display region of the display panel, at least two color filters in each color filter unit are sequentially arranged on the base substrate, the blue color filter is closest to the second strip-shaped non-display region of the display panel, and the first strip-shaped non-display region is sequentially adjacent to the second strip-shaped non-display region in a clockwise order.

The reason why the color filter substrate is mounted in the above manner is as follows. In the display panel, the arrangement direction of the color filters in the color filter unit in the color filter substrate is typically parallel to the strip-shaped non-display region (or a border) where the IC is located. For example, when observing from the front of the display panel, the color filters in the color filter unit are typically arranged along the horizontal direction if the IC is provided in the bottom border of the display panel. Additionally, with respect to the display panel wherein the IC is in the bottom border, the color filter first produced is typically the color filter located on the leftmost observing from the front of the display panel, based on the standard equipment and process for the production of color filter substrates in the related art. Therefore, the first production of the blue color filter corresponds to the production of the color filter substrate wherein the color filter in the position described above is blue. A relatively thin blue color filter will be obtained by using such a configuration in the case of the standard equipment and process.

In other words, it is convenient to produce the display panel having the positional relationships of the non-display region, the integrated circuit, and the blue color filter in the color filter substrate as described above. Such a display panel may be conveniently produced by the following method: producing a color filter substrate wherein the blue color filter is at one end of the color filter line by using the production method described above, wherein certainly the thickness of the blue color filter is the smallest; then mounting the color filter substrate into the display panel according to the positions described above. By using these steps of production and mounting, the display panel may be industrially produced without changing the current industrial standard production line.

However, it is to be understood that when the color filter substrate is produced by using other orders and processes of production, the arrangement of the color filters in the color filter unit may also be in other forms, as long as the thickness of the blue color filter finally formed is the smallest.

Typically, the display panel is rectangular and has four strip-shaped non-display regions, which are adjacent to each other in a clockwise order observing from the front of the display panel and are all adjacent to a rectangular display region at the center. The strip-shaped non-display region is typically a border region. In this disclosure, however, the display panel is not limited to be rectangular. For example, it may be of any shape, for example, a polygon, wherein each border corresponds to one strip-shaped non-display region. The display region is not limited to be rectangular, either, as long as it is surrounded by the non-display regions, for example. The strip-shaped display region may be rectangular, but is not limited thereto. For example, it may be curved.

In this disclosure, observing the display from the front of the display panel refers to observing from a light emergent side of the display panel.

Optionally, when the IC is provided in the bottom strip-shaped non-display region of the display panel, the color filter layer is provided above the IC. When the IC is provided in the top strip-shaped non-display region of the display panel, the color filter layer is provided below the IC. The thickness of the blue color filter is thus allowed to be the smallest without changing current conditions of production process.

When the IC is provided in the bottom strip-shaped non-display region of the display panel, at least two color filters comprised in each color filter unit are arranged, in this order, from left to right, along the line direction of the base substrate, and the blue color filter B is arranged on the leftmost. When the IC is provided in the top strip-shaped non-display region of the display panel, at least two color filters comprised in each color filter unit are arranged, in this order, from right to left, along the line direction of the base substrate, and the blue color filter B is arranged on the rightmost.

Exemplarily, FIG. 7-1 is a plan view of a display panel provided in an embodiment of this disclosure. The color filter layer in the display panel is located in the display region AA of the display panel. The IC of the display panel is provided in the bottom strip-shaped non-display region BB of the display panel. Each color filter unit comprises a blue color filter B, a red color filter R, and a green color filter G arranged in this order along the line direction of the base substrate. The blue color filter B is located on the leftmost.

In the display panel as shown in FIG. 7-1, the red color filter R is on the rightmost side of the display region AA. In practical applications, the green color filter G may also be on the rightmost side of the display region AA with reference to FIG. 7-2, or the blue color filter B may also be on the rightmost side of the display region AA with reference to FIG. 7-3. That is, the color filter unit at the edge of the display region may be incomplete. The color filter at the edge of the display region is not limited in embodiments of this disclosure.

As described hereinbefore, in industrial production of display panels, the mounting direction of the color filter substrate complies with industrial standards when it is mounted in a display panel. The color filter line in the color filter unit in the color filter substrate is parallel to the border where the IC is located, and the color filter first formed in the color filter substrate is closest to the border next to the border where the IC is located along the clockwise direction. For example, when the IC is in the bottom non-display region of the display panel, the arrangement of the color filters in the color filter unit is parallel to the bottom border, i.e., horizontal. In this case, after the color filter substrate is produced and then mounted in the display panel, the color filter first formed will be located on the leftmost of each color filter unit. When the display panel is an active liquid crystal display panel, at least two color filters comprised in each color filter unit are arranged, in this order, from left to right, along the line direction of the base substrate, and the blue color filter is arranged on the leftmost. That is, at least two color filters comprised in each color filter unit are arranged, in this order, along the direction of gate line scanning, and the blue color filter is arranged on the frontmost.

In the embodiments described above, illustration is made by exemplifying that the IC is provided in the bottom strip-shaped non-display region of the display panel. With the structure wherein the IC is provided in the top strip-shaped non-display region of the display panel, the structure wherein the IC is provided in the bottom strip-shaped non-display region of the display panel may be referred to. Verbose words are omitted in embodiments of this disclosure.

In summary, the display panel provided in an embodiment of this disclosure comprises a color filter substrate. Since the thickness of the blue color filter in the color filter substrate is less than those of other color filters, the light transmittance of the blue color filter is greater than those of other color filters. In the case where the grayscale degree of the display panel is relatively high, the blue light transmitted by the blue color filter is allowed to be balanced with light transmitted by other color filters when the display panel displays images to reduce the impact of the blue grey inversion effect and improve the color fidelity of images, so that the display effect of the display panel may be ensured.

The display panel in this disclosure may be produced by any standard process in the related art, as long as the blue color filter is first produced. Therefore, costs of equipment and process are saved.

An embodiment of this disclosure provides a display apparatus, comprising the display panel as shown in FIG. 7.

In the specific practice, the display apparatus provided in embodiments of this disclosure may be any product or member having the function of display, such as a cell phone, a tablet computer, a television, a display, a laptop, a digital photo frame, a navigator, etc.

In summary, the display apparatus provided in an embodiment of this disclosure comprises a color filter substrate. Since the thickness of the blue color filter in the color filter substrate is less than those of other color filters, the light transmittance of the blue color filter is greater than those of other color filters. In the case where the grayscale degree of the display panel is relatively high, the blue light transmitted by the blue color filter is allowed to be balanced with light transmitted by other color filters when the display panel displays images to reduce the impact of the blue grey inversion effect and improve the color fidelity of images, so that the display effect of the display panel may be ensured.

Those described above are merely optional embodiments of this disclosure, and are not intended to limit this disclosure. All of modifications, equivalent replacements, improvements, and the like, which are within the spirit and the principle of this disclosure, should be encompassed in the scope protected by this disclosure.

What is claimed is:

1. A color filter substrate, comprising:
   a base substrate;
   a plurality of color filter units in an array arrangement on the base substrate, wherein each of the color filter units comprises a blue color filter, a red color filter, and a green color filter;
   wherein the blue color filter has the smallest thickness among the color filters of each of the color filter units,
   wherein in each of the color filter units, the color filters are aligned in a line, and the blue color filter is located at an end portion of the line, and
   wherein:
      the blue color filter has a thickness of 1.55 micrometers to 2.00 micrometers, the red color filter has a thickness of 1.70 micrometers to 2.15 micrometers, and the green color filter has a thickness of 1.85 micrometers to 2.30 micrometers; or
      the blue color filter has a thickness of 1.55 micrometers to 2.00 micrometers, the green color filter has a thickness of 1.70 micrometers to 2.15 micrometers, and the red color filter has a thickness of 1.85 micrometers to 2.30 micrometers.

2. The color filter substrate according to claim 1, wherein the blue color filter has the largest area among the color filters of each of the color filter units.

3. The color filter substrate according to claim 1, wherein the area of the blue color filter is 1.05 to 1.1 times that of the red color filter, and/or the area of the blue color filter is 1.05 to 1.1 times that of the green color filter.

4. The color filter substrate according to claim 1, wherein the color filters are produced from a resin material.

5. The color filter substrate according to claim 1, further comprising a black matrix which is on the base substrate and between the color filter units.

6. A method for producing the color filter substrate of claim 1, wherein each color filter is formed by the steps of:
   covering the base substrate with a color filter material layer;
   covering the color filter material layer with a photoresist layer;
   exposing and developing the photoresist layer to pattern the photoresist layer and expose a part of the color filter material layer; and
   performing etching treatment and removing the exposed color filter material layer and the patterned photoresist layer to form a patterned color filter,
   wherein the blue color filter is first formed, and the blue color filter is etched and the thickness thereof is reduced in the process(es) of forming one or more other color filters.

7. The method according to claim 6, wherein
   in each of the color filter units, the color filters are aligned in a line, and the blue color filter is located at an end portion of the line.

8. A display panel, comprising:
   an array substrate;
   the color filter substrate of claim 1; and
   a liquid crystal layer located between the array substrate and the color filter substrate.

9. The display panel according to claim 8, wherein:
   the display panel comprises an integrated circuit;
   the display panel has a display region, a first strip-shaped non-display region, and a second strip-shaped non-display region;
   the color filter substrate is in the display region, the integrated circuit is in the first strip-shaped non-display region, and the first strip-shaped non-display region is adjacent to the second strip-shaped non-display region in a clockwise order observed from the front of the display panel; and
   in each of the color filter units, the at least two color filters are aligned in a line, the blue color filter is located at an end portion of the line, and the blue color filter is closest to the second strip-shaped non-display region; and
   wherein:
      the first strip-shaped non-display region is below the display region and the second strip-shaped non-display region is on the left of the display region observing from the front of the display panel, or
      the first strip-shaped non-display region is above the display region and the second strip-shaped non-display region is on the right of the display region observing from the front of the display panel.

10. A display apparatus, comprising the display panel of claim 8.

* * * * *